(12) United States Patent
Daugherty, Jr.

(10) Patent No.: US 6,269,916 B1
(45) Date of Patent: Aug. 7, 2001

(54) BRAKE CYLINDER USING DUAL PISTON ASSEMBLIES

(75) Inventor: David W. Daugherty, Jr., Plainfield, IL (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/358,599

(22) Filed: Jul. 21, 1999

(51) Int. Cl.[7] .................................................. B60T 11/10
(52) U.S. Cl. ............................ 188/153 R; 188/151 R; 188/348; 188/72.4
(58) Field of Search ..................... 188/153 R, 151 R, 188/348, 153 D, 153 A, 72.4, 366, 367, 368, 203, 170

(56) References Cited

U.S. PATENT DOCUMENTS

| | | | |
|---|---|---|---|
| 3,068,841 | * | 12/1962 | Robbins et al. ..................... 91/208 |
| 3,595,348 | * | 7/1971 | Kyllonen ........................... 188/203 |
| 3,779,135 | * | 12/1973 | Sugimura ............................ 91/45 |
| 4,033,629 | * | 7/1977 | Spalding ........................... 188/170 |
| 4,225,193 | * | 9/1980 | Hart .................................. 303/35 |
| 4,467,605 | * | 8/1984 | Smith ................................ 188/348 |
| 4,493,246 | * | 1/1985 | Dailbout .......................... 188/196 P |
| 4,925,618 | * | 5/1990 | Takada .............................. 264/328.1 |
| 5,746,293 | | 5/1998 | Engle ................................ 188/151 R |

* cited by examiner

Primary Examiner—Robert J. Oberleitner
Assistant Examiner—Mariano Sy
(74) Attorney, Agent, or Firm—James Ray & Associates

(57) ABSTRACT

A brake cylinder for use in a railway vehicle braking system is provided. The brake cylinder comprises a cylindrical casing engageable with the railway vehicle braking system, a hollow piston assembly which is mounted for reciprocal movement within the cylindrical casing and having a hollow portion defined by a back wall and at least one sidewall. A small piston assembly is positioned within this hollow portion and includes a first surface facing the back wall of the hollow portion and a peripheral edge portion for sealingly engaging an inner surface of the sidewall of the hollow portion. A first space is defined by the back wall of the hollow portion, at least a portion of the inner surface of the at least one sidewall and the first surface of the small piston. Fluid pressure is supplied within this first space during a brake application of the railway vehicle braking system resulting in movement of the hollow piston assembly away from the small piston assembly and consequently initiating a braking sequence of the railway vehicle braking system. Fluid pressure may also be evacuated from the first space during a brake release of the railway vehicle braking system resulting in movement of the hollow piston assembly toward the small piston assembly.

14 Claims, 6 Drawing Sheets

BRAKE CYLINDER USING DUAL PISTON ASSEMBLIES

FIELD OF THE INVENTION

The present invention relates, in general, to a brake cylinder for use in railway vehicle brake assemblies and, more particularly, to a brake cylinder using a dual piston assembly with two sealing surfaces for generating forces under varying load conditions for initiating a braking sequence in railway vehicle brake assemblies. The brake cylinder of the invention is especially suitable for truck-mounted braking assemblies.

BACKGROUND OF THE INVENTION

As is generally well known in the railway industry, truck mounted braking systems comprise a series of force transmitting members, levers and linkages which function to move a group of brake shoes against the wheels of a railway vehicle to effect stoppage of such railway vehicle. A pneumatically activated brake cylinder is typically provided in the braking system to initiate movement of this series of force transmitting members, levers and linkages to apply the brakes of the railway vehicle. A well known type of truck mounted braking system is a TMX® truck mounted braking system (TMX® is a registered trademark of Westinghouse Airbrake company, the assignee of the present invention).

A currently used pneumatically activated brake cylinder for TMX® truck mounted braking systems is shown in FIG. 2 and comprises an air cylinder piston which moves in a forwardly direction within a cylindrical member upon the application of pneumatic pressure thereto. A sealing means is provided on, or adjacent, a first end of the piston. This sealing means contacts the inner surface of the cylindrical member so as to provide an airtight chamber at one end of the cylindrical member such that application of pneumatic pressure therein and against the first end of the piston enables forward movement of the piston. A piston rod is attached at a second end of the piston and moves in accordance with movement of the piston. An opposite end of the piston rod is connected to the end of a push rod which is, in turn, connected to a cylinder force transfer lever. This cylinder force transfer lever is connected through a series of force transmitting members and linkages so as to initiate a braking sequence and consequently apply the brake shoes to the vehicle wheels.

A disadvantage of this type of pneumatically activated brake cylinder is that, due to regulations regarding the amount of air pressure which must be supplied into the brake cylinder, it is sometimes difficult to control the movement and/or force applied by the piston. During light load conditions, too much force applied by the piston can cause the brake shoe forces to be greater than necessary resulting in wheel skid.

SUMMARY OF THE INVENTION

The invention comprises a brake cylinder for use in a railway vehicle braking system comprising a cylindrical casing engageable with the railway vehicle braking system. A hollow piston assembly which is mounted for reciprocal movement within the cylindrical casing. This hollow piston assembly has a hollow portion defined by a back wall and at least one sidewall. A small piston assembly is positioned within this hollow portion. The small piston assembly includes a first surface facing the back wall of the hollow portion and a peripheral edge portion for sealingly engaging an inner surface of the at least one sidewall of the hollow portion. A first space is defined by the back wall of the hollow portion, at least a portion of the inner surface of the at least one sidewall and the first surface of the small piston. Fluid communication means are provided which are in fluid communication with the first space for supplying fluid pressure within this first space during a brake application of the railway vehicle braking system resulting in movement of the hollow piston assembly away from the small piston assembly and for evacuating fluid pressure from the first space during a brake release of the railway vehicle braking system resulting in movement of the hollow piston assembly toward the small piston assembly. A piston rod assembly having a first end and a second end is provided. The first end of the piston rod assembly is connected with the hollow piston assembly and the second end of the piston rod assembly is engageable with the brake rigging of the railway vehicle such that movement of the piston rod assembly in an outward direction during a brake application initiates a braking sequence of the railway vehicle braking system.

OBJECTS OF THE INVENTION

It is an object of the present invention to provide a brake cylinder using dual piston assemblies with two sealing surfaces which allows for improved control of the movement of the brake cylinder piston and consequently improved control of the brake shoe forces.

It is a further object of the invention to provide a brake cylinder using dual piston assemblies which allows for a reduced amount of force to be applied to the brake cylinder piston during light load conditions.

It is yet a further object of the invention to provide a brake cylinder using dual piston assemblies which can readily supply sufficient force to the brake cylinder piston during full load conditions.

Although a number of objects and advantages of the present invention have been described in some detail above, various additional objects and advantages of the brake cylinder of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF THE INVENTION

Figure 1:
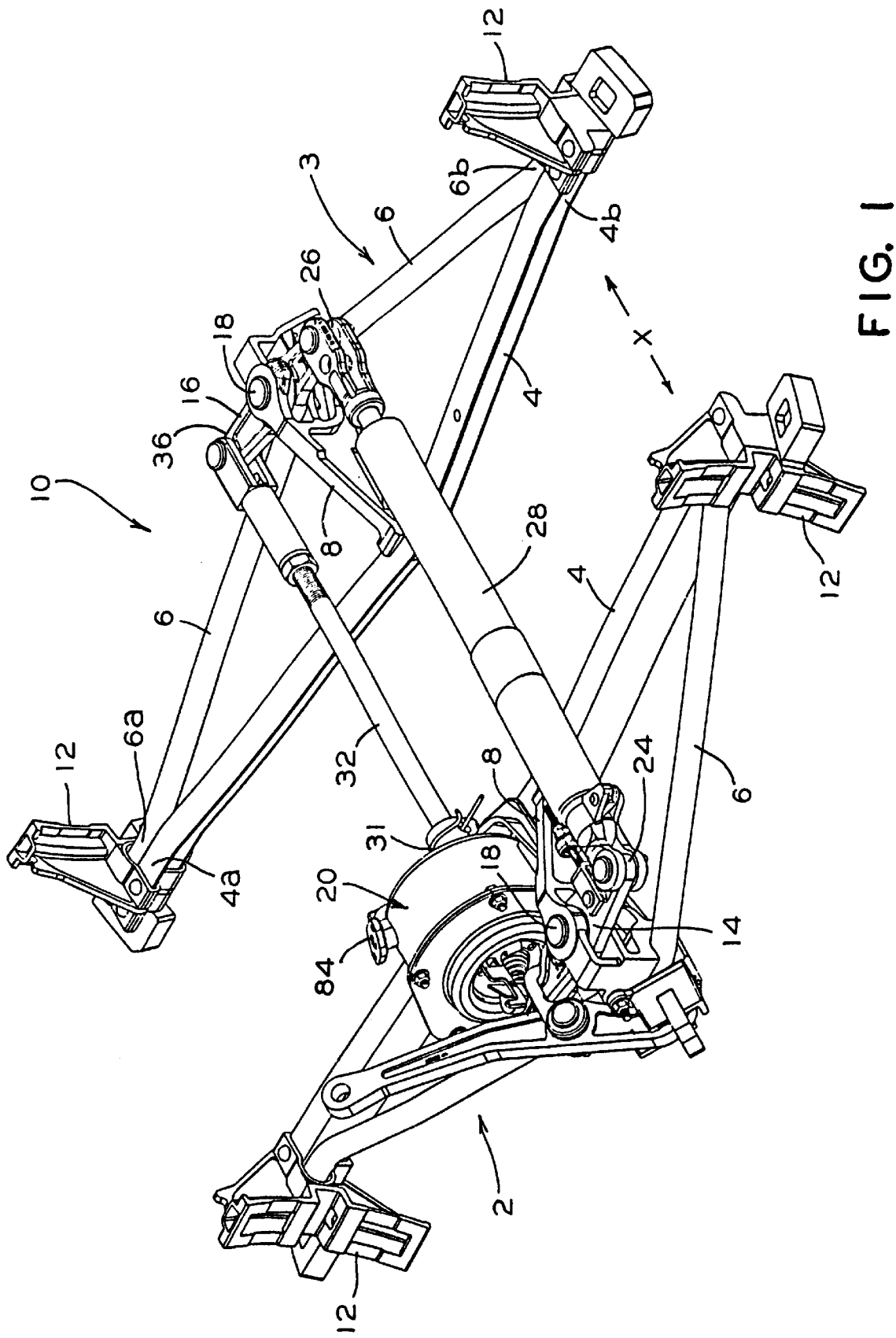
FIG. 1 is a plan view of a railway vehicle truck-mounted brake assembly including the brake cylinder of the present invention.

Prior to proceeding with the more detailed description of the invention, a description of a truck mounted braking system and its functioning should provide helpful in understanding the present invention. Also, it should be noted that for the sake of clarity, identical components which have identical functions have been identified with identical reference numerals throughout the several views illustrated in the attached drawing Figures.

Referring now to FIG. 1, there is shown a presently is preferred embodiment of a truck-mounted brake assembly, generally designated 10, for a railway car (not shown). This brake assembly 10 comprises brake beams, generally designated 2 and 3, which are substantially identical. Each of the brake beams 2 and 3 include a compression member 4, a tension member 6 and a strut member 8. The opposite ends of the compression member 4 and the tension member 6 may be permanently connected together, preferably, by welding along an outer segment 4a–6a, 4b–6b at the opposite ends of the compression member 4 and the tension member 6.

At a location substantially midway between their opposite ends, the compression member 4 and the tension member 6 of the, respective, brake beams 2 and 3 are spaced apart sufficiently to allow connection of the strut member 8 therebetween. Mounted on the respective outer end segments 4a–6a of the brake beams 2 and 3 are brake heads 12.

A pair of force-transfer levers 14 and 16 are pivotally connected by pins 18 to the strut member 8 of the respective brake beams 2 and 3. Each end 24 and 26 of the respective force-transfer levers 14 and 16 is interconnected via a force-transmitting member 28, which may be in the form of a slack adjuster device. A brake cylinder assembly, generally designated 20, is mounted on the brake beam 2 and is associated with force-transfer lever 14, as described in detail below. A connecting means 31 is provided for connecting the brake cylinder assembly 20 to a force-transmitting member or a return push rod assembly 32. This return push rod assembly 32 is secured at an opposite end with an end 36 of the force-transfer lever 16.

Figure 2:
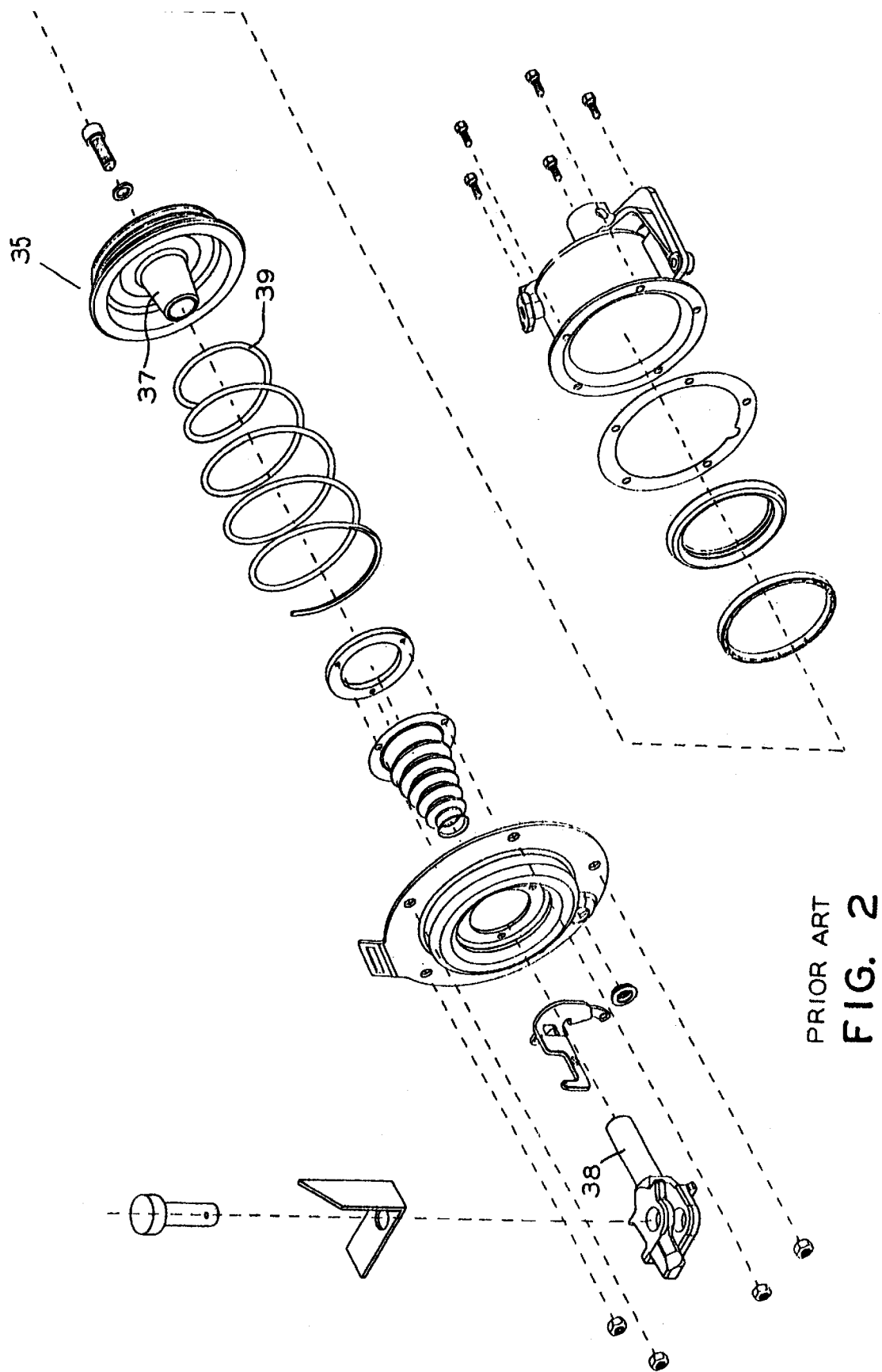
FIG. 2 is an expanded view of the prior art type brake cylinder which is currently in use in TMX® truck mounted braking systems.

When a brake application is made, pressurization of the brake cylinder assembly 20 will result in actuation of an air brake cylinder piston 35, located in the brake cylinder assembly 20 and illustrated in FIG. 2. This actuation of the piston 35 causes movement of a piston rod 37 in a forward direction which causes a return urging means, such as a return spring 39, to compress. The piston rod 37 is associated with the force transfer lever 14 via a push rod 38 such that actuation of the brake cylinder, in this manner, will result in movement of a push rod 38 in a direction to effect a counterclockwise rotation of the force-transfer lever 14. The force transfer lever 14, in turn, causes the slack adjuster assembly 28 to effect counterclockwise rotation of the force-transfer lever 16 and consequent force acting on the return push rod assembly 32.

The force-transfer levers 14 and 16, along with the slack adjuster assembly 28, the return push rod assembly 32 and the brake cylinder assembly 20 comprise a brake beam actuating linkage that interconnects brake beams 2 and 3 via the pivot pins 18 and thus the required brake actuation forces effectively act along these pivot pins 18. The resultant of these forces is shown at X. Because the slack adjuster assembly 28 acts as a rigid member during a brake application, it is important that the length of the slack adjuster assembly 28 be allowed to increase with brake shoe wear and/or loss of a brake shoe during service so that movement of the brake cylinder piston 35 and piston rod 37 will enable such brake beams 2 and 3 to be moved apart by the brake beams linkage until brake shoe engagement with the tread surface of the vehicle wheels occurs.

As discussed above and illustrated in FIG. 2, currently used air brake cylinders comprise an air cylinder piston 35 which moves in a forwardly direction upon the application of pneumatic pressure at one side thereof. A piston rod 37 is attached to an opposite side of the piston 35 and moves in accordance with the movement of the piston 35. A second end of the piston rod 37 is connected to the end of a push rod 38 which is, in turn, connected to the force transfer lever 14. This type of design requires the provision of an air tight seal between the edge of the piston 35 and the inner surface of the cylinder so that pneumatic pressure applied to one side of the piston 35 effects movement of the piston 35 and piston rod 37 in a forwardly direction.

A disadvantage with this type of system is that it is difficult to control the movement and/or amount of force applied by the piston which results in difficulty in controlling the brake shoe forces. Some countries require that a certain amount of pressure, such as at least 1–1.15 bar greater than atmosphere, be applied within the brake cylinder. Due to the size of the brake cylinder, this amount of pressure applied therein can cause a high amount of force being applied by the piston and consequently the brake shoes. During light load conditions of the railway vehicle, this high amount of force applied by the brake shoes to the wheels is not necessary in order to stop the railway vehicle and can consequently cause skidding of the brake shoes against the wheels. The dual piston actuator of the present invention provides a means for stopping the railway vehicle under light load conditions while avoiding skidding of the vehicle wheels. During full load conditions, a second air inlet means is provided on the cylindrical member so that sufficient pressure may be applied to the piston to stop the railway vehicle.

Figure 3A:
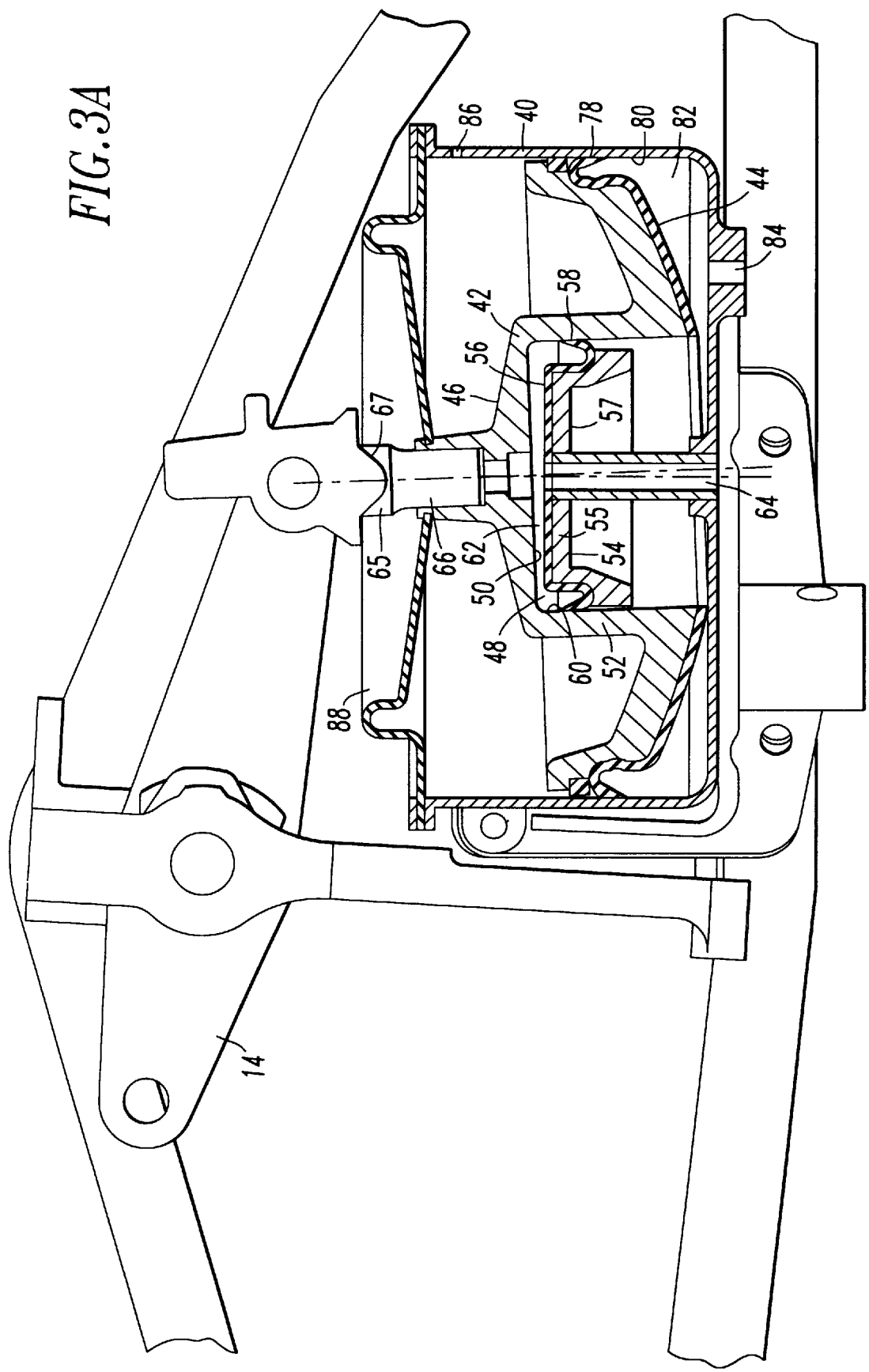
FIGS. 3A–3C are cross-sectional views of the brake cylinder of the invention at various stages of actuation.
Figure 3B:
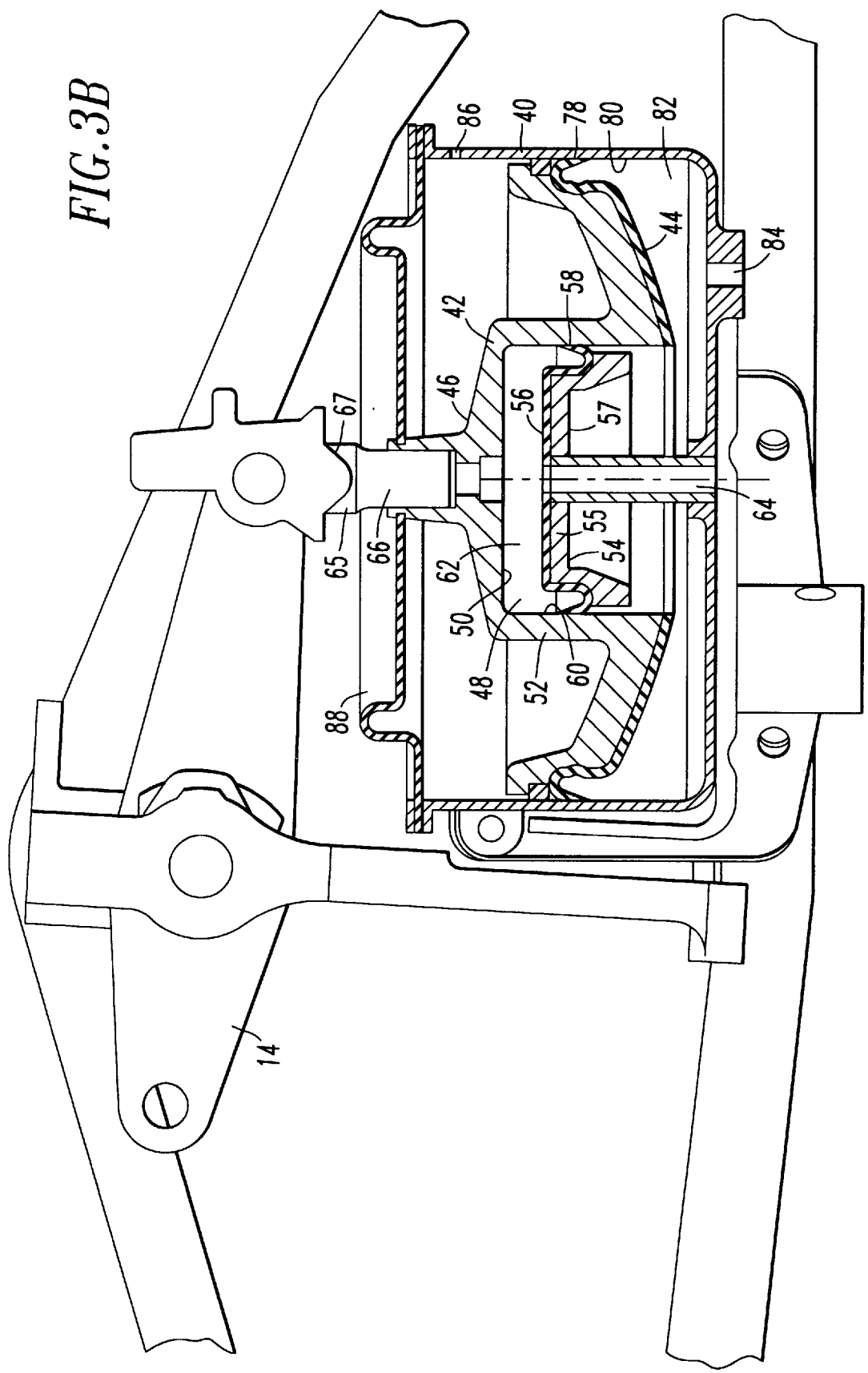
Figure 3C:
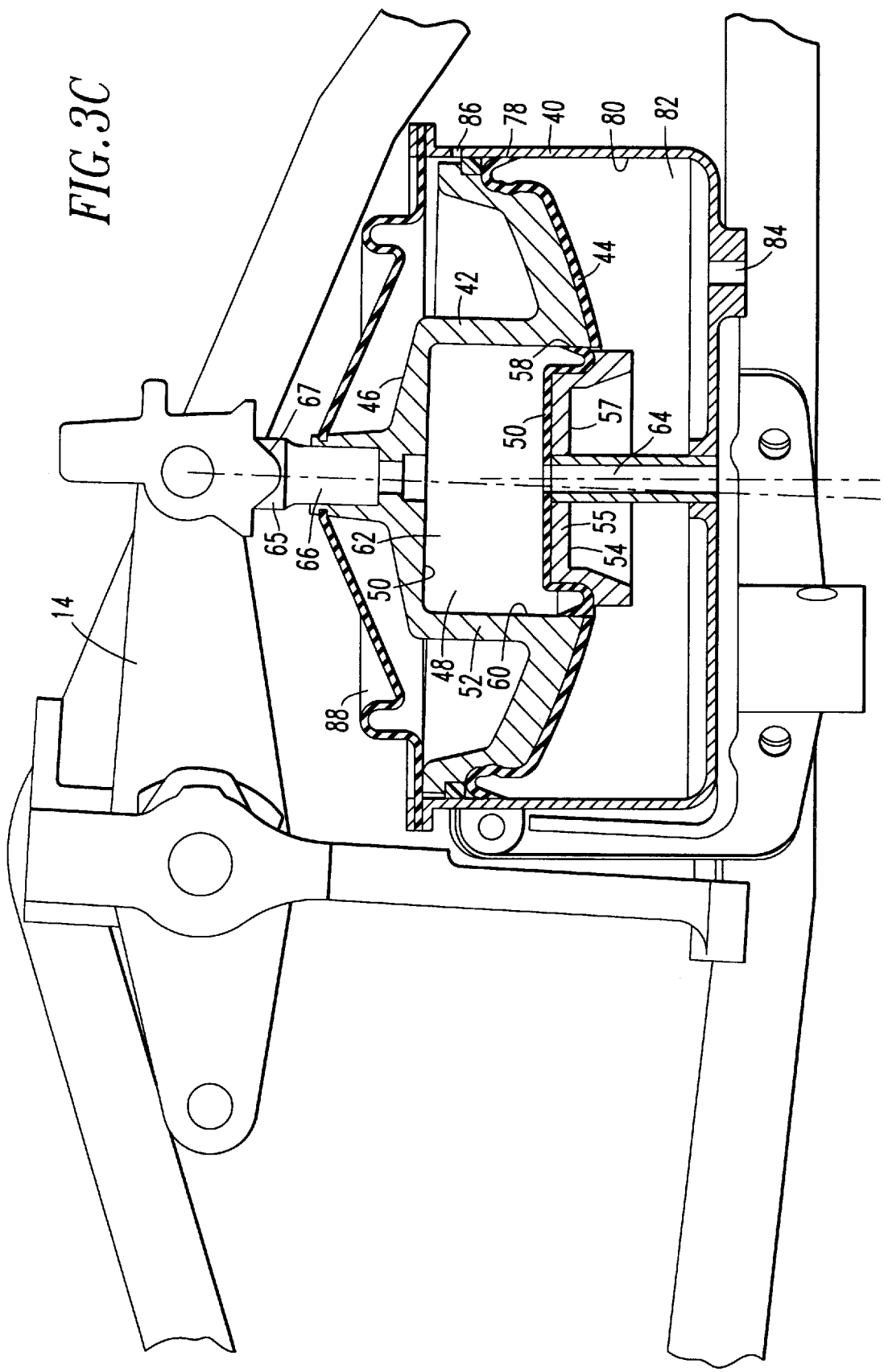

Referring to FIGS. 3A–3C, cross-sectional views of the brake cylinder of the invention at various stages of actuation are shown. The brake cylinder comprises a cylindrical casing 40 engageable with the railway vehicle braking system 10. A hollow piston assembly 42 is mounted for reciprocal movement within the cylindrical casing. This hollow piston assembly has a hollow portion 48 defined by a back wall 50 and at least one side wall 52. A small piston assembly 54 is positioned within this hollow portion 48. The small piston assembly 54 includes a first surface 56 facing the back wall 50 of the hollow portion 48 and a peripheral edge portion 58 for sealingly engaging an inner surface 60 of the at least one sidewall 52 of the hollow portion 42. A first space 62 is defined by the back wall 50 of the hollow portion 48, at least a portion of the inner surface 60 of the at least one sidewall 52, and the first surface 56 of the small piston assembly 54.

A first fluid communication means 64 is provided in fluid communication with the first space 62 for supplying fluid pressure within this first space 62, during a brake application of the railway vehicle braking system, resulting in movement of the hollow piston assembly 42 away from the small piston assembly 54 and for evacuating fluid pressure from the first space 62, during a brake release of the railway vehicle braking system, resulting in movement of the hollow piston assembly 42 toward the small piston assembly 54. The fluid communication means 64 may be any well known means capable of supplying fluid pressure into the first space 62. For example, the fluid communication means 64 may be an aperture or a tubular member extending through a wall 55 of the small piston assembly 54.

A piston rod assembly 65 having a first end 66 and a second end 67 is provided. The first end 66 of the piston rod assembly 65 is connected with the hollow piston assembly 42 and the second end 67 of the piston rod assembly 65 is engageable with the brake rigging of the railway vehicle such that movement of the piston rod assembly 65 in an outward direction during a brake application initiates a braking sequence of the railway vehicle braking system. The second end 67 of the piston rod assembly 65 is associated with the braking system's force transfer lever 14, typically via a push rod 38, so that the outward movement of the piston rod assembly 65 initiates a braking sequence of the railway vehicle braking system.

Figure 4:
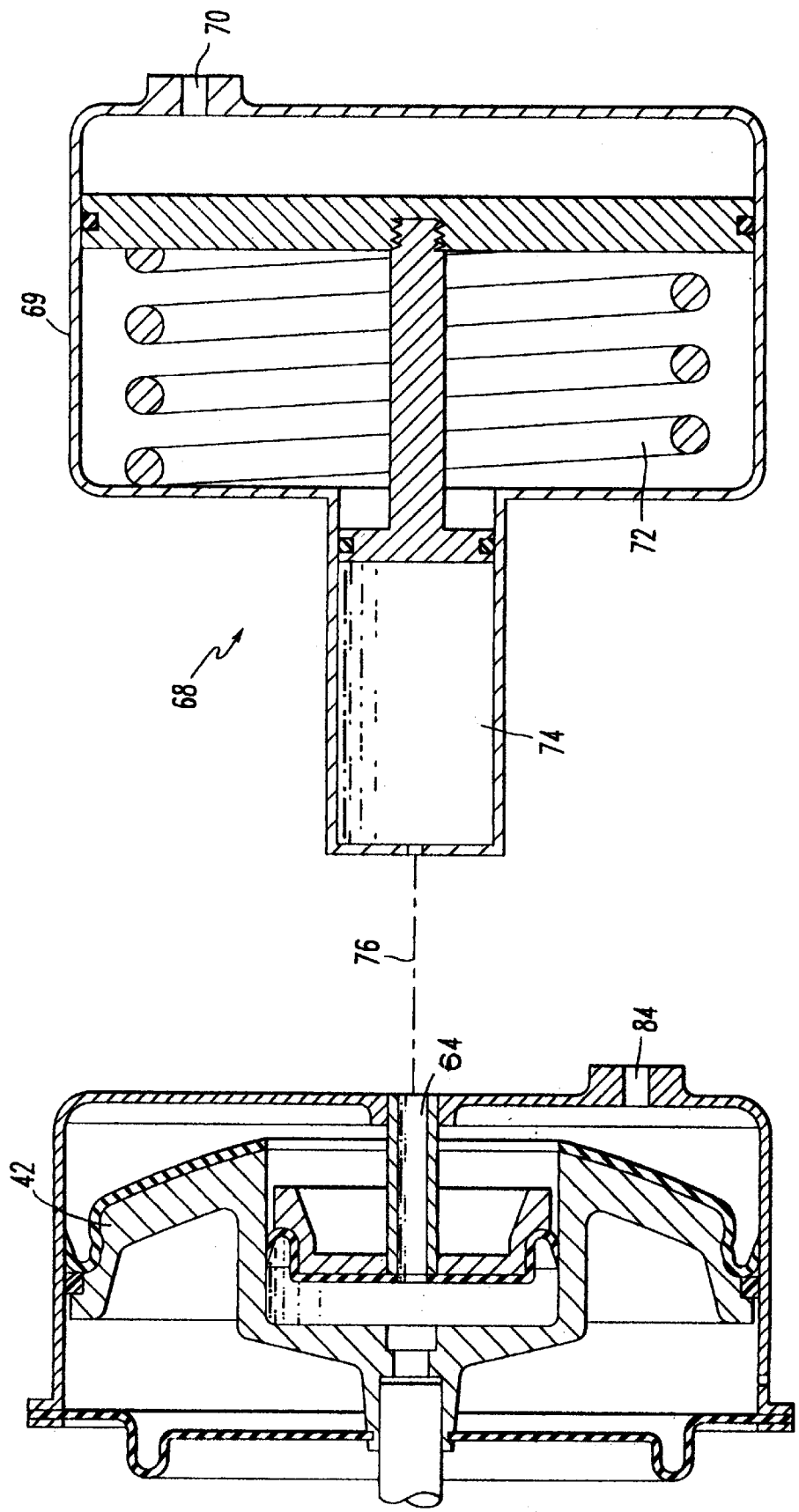
FIG. 4 is a cross-sectional view of a pneumatic pressure to hydraulic pressure intensifier which may be used to supply fluid pressure to the brake cylinder of the invention.

The fluid communication means 64 is associated with a source of fluid pressure such as a pneumatic or a hydraulic pressure source. Any well known fluid pressure source may be used for supplying fluid pressure to the communication means 64. For example, the fluid communication means 64 may be connected to a pneumatic/hydraulic pressure intensifier 68, as illustrated in FIG. 4. A pneumatic/hydraulic pressure intensifier typically comprises a housing 69, an air inlet port 70 at a first end of the housing for allowing the application of pneumatic pressure into a first chamber, a piston return spring 72, a second chamber for containing hydraulic fluid therein 74 and a connection means 76 for transmitting the hydraulic pressure to the second piston assembly. A pneumatic/hydraulic pressure intensifier is described in detail in U.S. Pat. No. 5,746,293. This patent is assigned to the assignee of the present invention and is incorporated herein by reference thereto. A pneumatic/hydraulic pressure intensifier receives a predetermined pneumatic pressure as an input pressure in the first chamber and then communicates a higher predetermined hydraulic pressure as an output pressure to a predetermined apparatus, such as piston assembly 54, which is operated by the hydraulic pressure. The use of a pneumatic/hydraulic pressure intensifier 68 as the source of fluid pressure to the first space 62 would allow for the use of a smaller hydraulic cylinder, or small piston assembly 54, inside of the pneumatic cylinder, or hollow piston assembly 42.

The hollow piston assembly 42 includes an edge portion 78 which sealingly engages an inner surface 80 of the cylindrical casing 40. Any well known device, such as a packing cup, may be used to seal the edge 78 of the hollow piston assembly 42 to the inner surface 80 of the cylindrical casing. Sealing of the hollow piston assembly results in the formation of a second space 82 which is bound by at least a portion of surface 44 of the hollow piston assembly 42, at least a portion of a second surface 57 of the small piston assembly 54, and at least a portion of the inner surface 80 of the cylindrical casing 40.

A second fluid communication means 84 is provided for supplying fluid pressure to the second space 82 during a brake application of such railway vehicle braking system. This application of fluid pressure typically occurs when the railway vehicle is under full load conditions and a greater force is required to stop the vehicle. This second fluid communication means 84 also includes means for evacuating fluid pressure from the second space 82 during a brake release of such railway vehicle braking system.

A means for preventing the entrance of undesirable and/or detrimental elements within the brake cylinder, such as a dust boot 88, is positioned adjacent at least a portion of the outer surface 46 of the hollow piston assembly 42. Also included on the cylindrical housing 40 is a means for venting 86 the second space 82 to atmosphere during application of fluid pressure within the first space 62 so as to relieve any pressure trapped within the housing as a result of actuation of one or both of the piston assemblies.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skill in the art without departing from the spirit and scope of the invention as set forth in the appended claims.

I claim:

1. A brake cylinder for use in a railway vehicle braking system comprising:
    (a) a cylindrical casing engageable with such railway vehicle braking system;
    (b) a hollow piston assembly mounted for reciprocal movement within said cylindrical casing, said hollow piston assembly having a hollow portion defined by a back wall and at least one sidewall;
    (c) a small piston assembly positioned within said hollow portion, said small piston assembly including a first surface facing said back wall and a peripheral edge portion for sealingly engaging an inner surface of said at least one sidewall;
    (d) a first space defined by said back wall of said hollow portion, at least a portion of said inner surface of said at least one sidewall and said first surface of said small piston assembly;
    (e) first fluid communication means in fluid communication with said first space for supplying fluid pressure within said first space during a brake application of such railway vehicle braking system resulting in movement of said hollow piston assembly away from said small piston assembly and for evacuating fluid pressure from said first space during a brake release of such railway vehicle braking system resulting in movement of said hollow piston assembly toward said small piston assembly; and
    (f) a piston rod assembly having a first end and a second end, said first end being connected with said hollow piston assembly and said second end being engageable with brake rigging of such railway vehicle such that movement of said piston rod assembly in an outward direction during such brake application initiates a braking sequence of such railway vehicle braking system.

2. A brake cylinder as recited in claim 1 wherein said first fluid communication means includes one of an aperture and a tubular member which extends through a wall of said small piston assembly.

3. A brake cylinder as recited in claim 2 wherein said one of an aperture and a tubular member is associated with a pneumatic pressure source.

4. A brake cylinder as recited in claim 2 wherein said one of an aperture and a tubular member is associated with a hydraulic pressure source.

5. A brake cylinder as recited in claim 4 wherein said first fluid communication means includes a pneumatic/hydraulic pressure intensifier.

6. A brake cylinder as recited in claim 1 wherein said hollow piston assembly includes an edge portion sealingly engaging an inner surface of said cylindrical casing.

7. A brake cylinder as recited in claim 6 including a packing cup for sealingly engaging said hollow piston assembly with said inner surface of said cylindrical casing.

8. A brake cylinder as recited in claim 1 wherein said cylindrical casing includes means for mounting said cylindrical casing on a brake beam in a truck mounted braking system.

9. A brake cylinder as recited in claim 1 including a means for preventing the entrance of undesirable and/or detrimental elements within said brake cylinder, said means for preventing being positioned adjacent at least a portion of an outer surface of said hollow piston assembly.

10. A brake cylinder as recited in claim 9 wherein said means for preventing comprises a dust boot.

11. A brake cylinder for use in a railway vehicle braking system comprising:
   (a) a cylindrical casing engageable with such railway vehicle braking system;
   (b) a hollow piston assembly mounted for reciprocal movement within said cylindrical casing, said hollow piston assembly having a hollow portion defined by a back wall and at least one sidewall said hollow piston assembly including an edge portion sealingly engaging an inner surface of said cylindrical casing;
   (c) a small piston assembly positioned within said hollow portion, said small piston assembly including a first surface facing said back wall and a peripheral edge portion for sealingly engaging an inner surface of said at least one sidewall;
   (d) a first space defined by said back wall of said hollow portion, at least a portion of said inner surface of said at least one sidewall and said first surface of said small piston assembly;
   (e) first fluid communication means in fluid communication with said first space for supplying fluid pressure within said first space during a brake application of such railway vehicle braking system resulting in movement of said hollow piston assembly away from said small piston assembly and for evacuating fluid pressure from said first space during a brake release of such railway vehicle braking system resulting in movement of said hollow piston assembly toward said small piston assembly;
   (f) a second space bound by a portion of a surface of said hollow piston assembly, at least a portion of a second surface of said small piston assembly, and at least a portion of the inner surface of said cylindrical casing; and
   (g) a piston rod assembly having a first end and a second end, said first end being connected with said hollow piston assembly and said second end being engageable with brake rigging of such railway vehicle such that movement of said piston rod assembly in an outward direction during such brake application initiates a braking sequence of such railway vehicle braking system.

12. A brake cylinder as recited in claim 11 including a second fluid communication means for supplying fluid pressure to said second space during a brake application of such railway vehicle braking system.

13. A brake cylinder as recited in claim 12 wherein said second fluid communication means includes means for evacuating fluid pressure from said second space during a brake release of such railway vehicle braking system.

14. A brake cylinder as recited in claim 11 including a means for venting said second space to atmosphere during application of fluid pressure within said first space.

* * * * *